(12) United States Patent
Zhang

(10) Patent No.: US 11,207,933 B2
(45) Date of Patent: Dec. 28, 2021

(54) GOLF CART FRONT SUSPENSION LIFT KIT

(71) Applicant: Yujie Zhang, Greenville, SC (US)

(72) Inventor: Yujie Zhang, Greenville, SC (US)

( * ) Notice: Subject to any disclaimer, the term of this patent is extended or adjusted under 35 U.S.C. 154(b) by 168 days.

(21) Appl. No.: 16/540,423

(22) Filed: Aug. 14, 2019

(65) Prior Publication Data

US 2021/0046794 A1  Feb. 18, 2021

(51) Int. Cl.
*B60G 7/02* (2006.01)
*B60G 3/20* (2006.01)
*B60G 7/00* (2006.01)
*B60G 15/02* (2006.01)

(52) U.S. Cl.
CPC .............. *B60G 7/02* (2013.01); *B60G 3/20* (2013.01); *B60G 7/001* (2013.01); *B60G 15/02* (2013.01); *B60G 2202/12* (2013.01); *B60G 2202/20* (2013.01); *B60G 2204/1242* (2013.01); *B60G 2204/143* (2013.01); *B60G 2204/418* (2013.01); *B60G 2206/124* (2013.01); *B60G 2206/50* (2013.01); *B60G 2300/26* (2013.01)

(58) Field of Classification Search
None
See application file for complete search history.

(56) References Cited

U.S. PATENT DOCUMENTS

| 1,474,057 A | 11/1923 | Pridemore |
| 2,162,828 A | 6/1939 | Slack |
| 2,297,901 A | 10/1942 | Leighton |
| 3,115,349 A | 12/1963 | Lerg |
| 4,321,988 A | 3/1982 | Bich |
| 4,964,651 A | 10/1990 | Kubo |
| 5,467,971 A | 11/1995 | Hurtubise et al. |
| 5,597,171 A | 1/1997 | Lee |
| 5,772,784 A | 3/1998 | Link |
| 5,785,332 A | 7/1998 | Pollock et al. |
| 5,967,536 A | 10/1999 | Spivey et al. |
| 6,102,419 A | 8/2000 | Chun |
| 6,616,156 B1 | 9/2003 | Dudding et al. |
| 6,746,032 B2 | 6/2004 | Seki |
| 7,322,591 B2 | 1/2008 | Seki |
| 7,392,997 B2 | 7/2008 | Sanville et al. |
| 7,581,740 B1 * | 9/2009 | Stimely .............. B60G 3/20  280/124.136 |
| 7,648,304 B2 | 1/2010 | Wolf |
| 7,883,100 B1 * | 2/2011 | Wu .................. B62K 5/01  280/124.136 |

(Continued)

FOREIGN PATENT DOCUMENTS

GB        2009682 A      6/1979
WO    WO 2018/130475    7/2018

*Primary Examiner* — Faye M Fleming
(74) *Attorney, Agent, or Firm* — Dority & Manning, P.A.

(57) ABSTRACT

A front suspension lift kit for a golf cart includes first and second beams mountable to a frame of the golf cart. A first strut is mountable to the frame of the golf cart and a distal end portion of the first beam such that the first strut extends between the frame of the golf cart and the first beam. A second strut is mountable to the frame of the golf cart and a distal portion of the second beam such that the second strut extends between the frame of the golf cart and the second beam. A support bracket is mountable to the first and second beams at the distal end portions of the first and second beams. The lift kit also includes a swing arm, a spindle bracket, and a coil-over shock.

20 Claims, 6 Drawing Sheets

(56) References Cited

U.S. PATENT DOCUMENTS

| | | |
|---|---|---|
| 8,708,359 B2 | 4/2014 | Murray |
| 8,801,037 B1 | 8/2014 | Inoue et al. |
| 8,944,465 B2 | 2/2015 | Shinbori |
| 8,967,639 B2 | 3/2015 | Conaway et al. |
| 9,174,505 B2 | 11/2015 | Gerrard |
| 9,409,457 B2 | 8/2016 | Gielisch et al. |
| 9,421,837 B2 | 8/2016 | Lake et al. |
| 9,475,357 B1 | 10/2016 | Hinz |
| 9,796,235 B2 | 10/2017 | Matayoshi et al. |
| 10,065,472 B2 | 9/2018 | Kashani |
| 10,144,260 B2 | 12/2018 | Durkovic et al. |
| 10,532,772 B2 * | 1/2020 | Upah .................. B62D 23/005 |
| 10,583,861 B2 * | 3/2020 | Taracko ............... B62D 23/005 |
| 2007/0267790 A1 | 11/2007 | Furman et al. |
| 2007/0267826 A1 | 11/2007 | Furman et al. |
| 2007/0267837 A1 | 11/2007 | Sanville |
| 2007/0267839 A1 | 11/2007 | Furman et al. |
| 2008/0067774 A1 | 3/2008 | Sanville et al. |
| 2010/0059945 A1 | 3/2010 | Kuwabara |
| 2013/0056948 A1 | 3/2013 | Kucinski et al. |
| 2013/0241167 A1 | 9/2013 | Perri et al. |
| 2015/0061275 A1 | 3/2015 | Deckard et al. |
| 2017/0015356 A1 | 1/2017 | Weifenbach et al. |
| 2018/0009281 A1 | 1/2018 | Shi et al. |
| 2018/0215220 A1* | 8/2018 | Mailhot ................ B60G 7/001 |
| 2018/0215223 A1 | 8/2018 | Mailhot et al. |
| 2018/0354329 A1 | 12/2018 | Zhang |

\* cited by examiner

GOLF CART FRONT SUSPENSION LIFT KIT

FIELD OF THE INVENTION

The present subject matter relates generally to lift kits for golf cart front suspensions.

BACKGROUND OF THE INVENTION

A golf cart generally includes a front suspension that connects the golf cart's frame and front wheels. The front suspension allows relative motion between the frame and front wheels. Thus, the front suspension contributes to the handling and ride quality of the golf cart.

A ride height of the front suspension is generally factory selected, and golf cart manufacturers frequently tune the front suspension for road or golf course conditions. Thus, the factory ride height of many gold carts is lower than preferred by some golf carts users. To increase the golf cart's ride height, a lift kit may be added to supplement or replace the factory front suspension.

Known lift kits have certain drawbacks. For example, certain lift kits require modifying the golf cart's frame. In particular, such lift kits can require drilling, welding or cutting the golf cart's frame, and such modifications can be labor intensive and/or require tools not available to all golf carts users.

BRIEF DESCRIPTION OF THE INVENTION

Aspects and advantages of the invention will be set forth in part in the following description, or may be apparent from the description, or may be learned through practice of the invention.

In a first example embodiment, a front suspension lift kit for a golf cart includes a first and second beams mountable to a frame of the golf cart. A first strut is mountable to the frame of the golf cart and a distal end portion of the first beam such that the first strut extends between the frame of the golf cart and the first beam. A second strut is mountable to the frame of the golf cart and a distal portion of the second beam such that the second strut extends between the frame of the golf cart and the second beam. A support bracket is mountable to the first and second beams at the distal end portions of the first and second beams. A swing arm is mountable to the support bracket such that the swing arm is rotatable on the support bracket. A spindle bracket is mountable to the swing arm such that the spindle bracket is rotatable on the swing arm. A coil-over shock is mountable to the spindle bracket.

In a second exemplary embodiment, a front suspension lift kit for a golf cart includes a first beam having a proximal end portion that is mountable to a frame of the golf cart. A second beam has a proximal end portion that is mountable to the frame of the golf cart. A first strut is mountable to the frame of the golf cart and a distal end portion of the first beam such that the first strut extends between the frame of the golf cart and the first beam. A second strut is mountable to the frame of the golf cart and a distal portion of the second beam such that the second strut extends between the frame of the golf cart and the second beam. A support bracket is mountable to the first and second beams at the distal end portions of the first and second beams. A swing arm is mountable to the support bracket such that the swing arm is rotatable on the support bracket. A spindle bracket is mountable to the swing arm such that the spindle bracket is rotatable on the swing arm. The spindle bracket includes a pair of spindle bearings. A spindle is mountable to the spindle bracket such that the spindle is rotatable on the pair of spindle bearings. A shock bracket is mountable to the first and second struts above the first and second beams. A coil-over shock is mountable to the spindle bracket and the shock bracket. The coil-over shock includes a cylinder and a flange. The flange of the coil-over shock extends outwardly from the cylinder of the coil-over shock. The flange of the coil-over shock is mountable to the spindle bracket. An end of the coil-over shock is rotatably mountable to the shock bracket. The end of the coil-over shock and the flange of the coil-over shock are positioned opposite each other on the coil-over shock.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
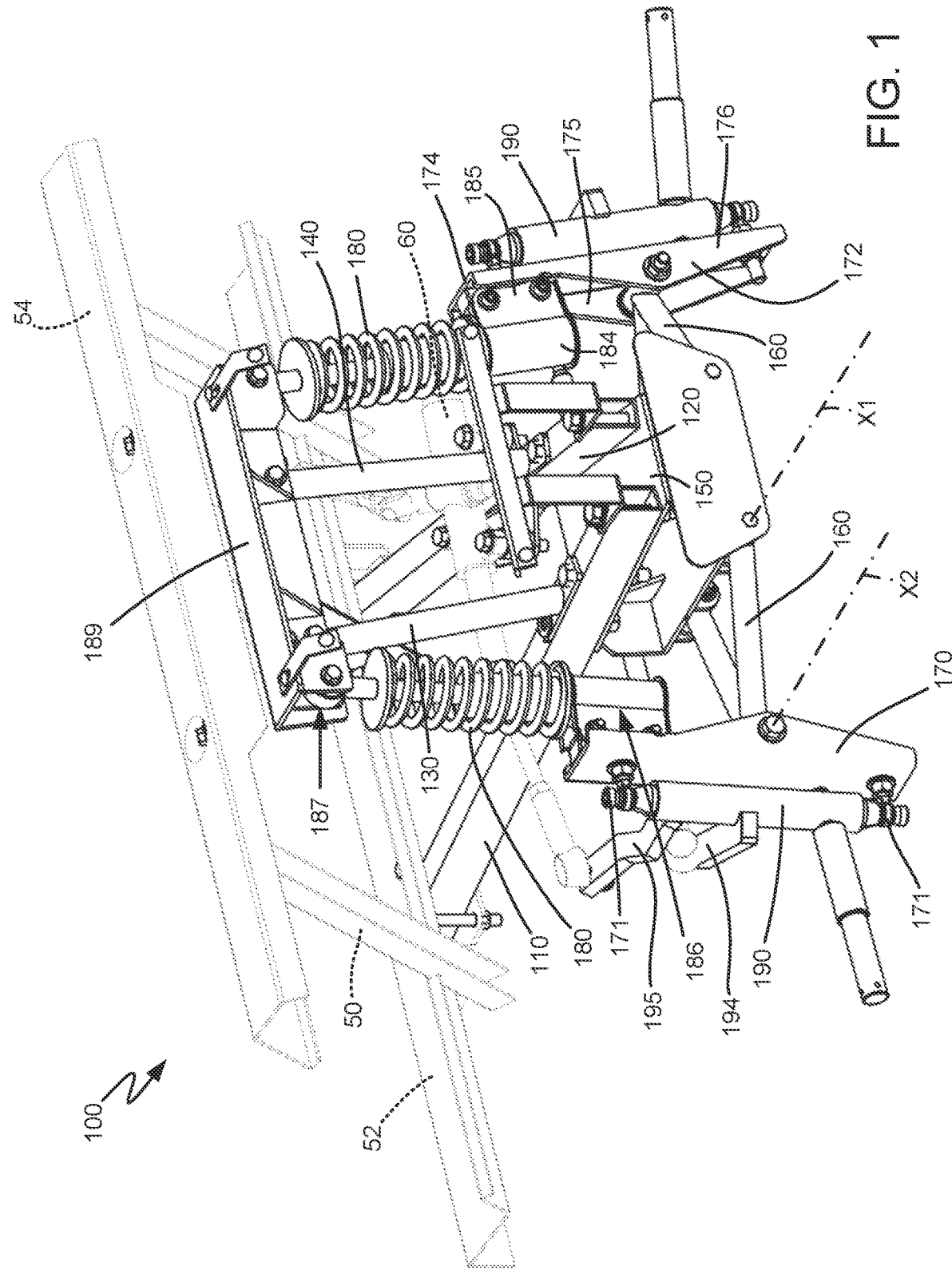
FIG. 1 is a perspective view of a front suspension lift kit for a golf cart according to a first example embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As may be seen in FIGS. 1 through 6, the present subject matter is directed to golf cart front suspension lifts. It will be understood that the golf cart front suspension lift kits described herein may be used in or with any suitable golf cart. As an example, the front suspension lift kits described herein may be used in or with an E-Z-GO® TXT® golf cart. Thus, the front suspension lift kits is described in greater detail below in the context of and are illustrated as suitable for use in E-Z-GO® TXT® golf carts. However, the present subject matter is not limited to any particular golf car model, style or arrangement. The use of the term "about" when used in conjunction with a numerical value is intended to refer to within twenty five percent (25%) of the stated numerical value.

Figure 2:
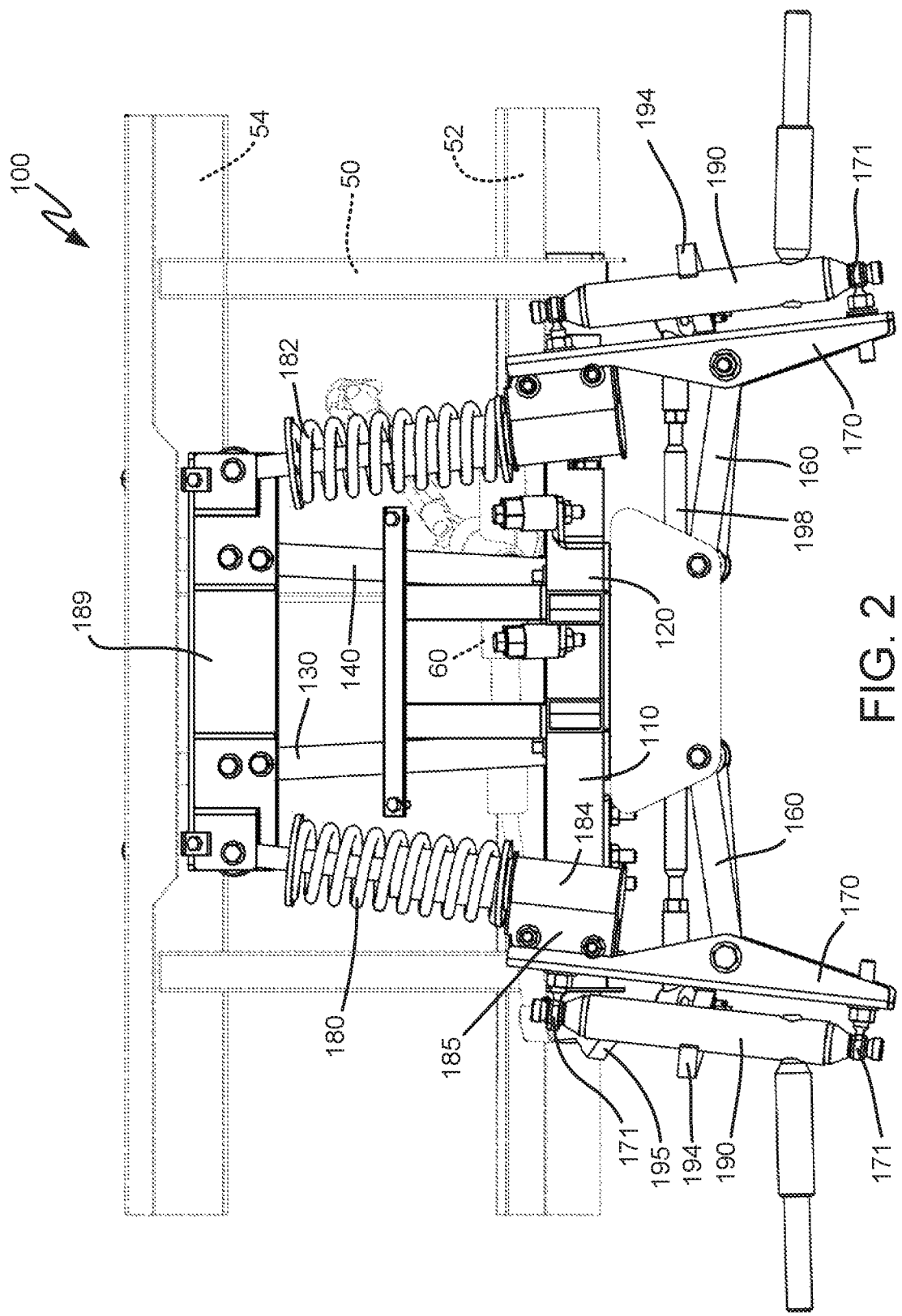
FIG. 2 is a front, elevation view of the example front suspension lift kit of FIG. 1.

FIG. 1 is a perspective view of a front suspension lift kit 100 for a golf cart 10 according to an example embodiment of the present subject matter. FIG. 2 is a front, elevation view of front suspension lift kit 100. Components of golf cart 10 are shown in dashed lines while components of front suspension lift kit 100 are shown in solid lines. Components of golf cart 10 may be factory or stock components that front suspension lift kit 100 cooperates with to adjust a ride height of golf cart 10. As may be seen in FIGS. 1 and 2, golf cart 10 includes a frame 50. Thus, frame 50 may be a factory or stock component of golf cart 10 and is not a component of front suspension lift kit 100. As discussed in greater detail below, front suspension lift kit 100 may be mounted to or on the existing components of golf cart 10, including frame 50, to adjust the ride height of golf cart 10.

Figure 3:
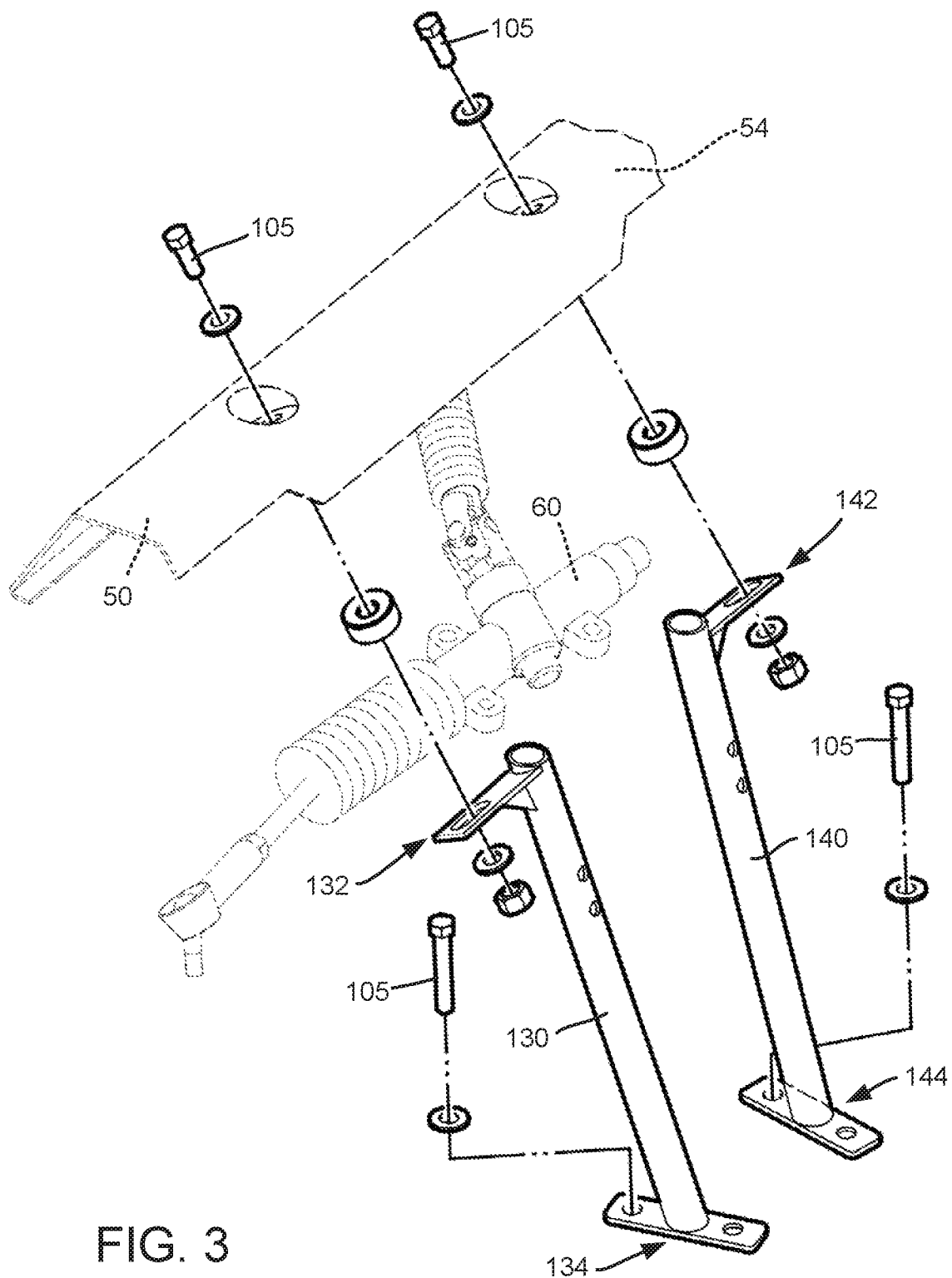
FIGS. 3, 4 and 5 are perspective views of certain components of the example front suspension lift kit of FIG. 1 being mounted to a frame of the golf cart.
Figure 4:
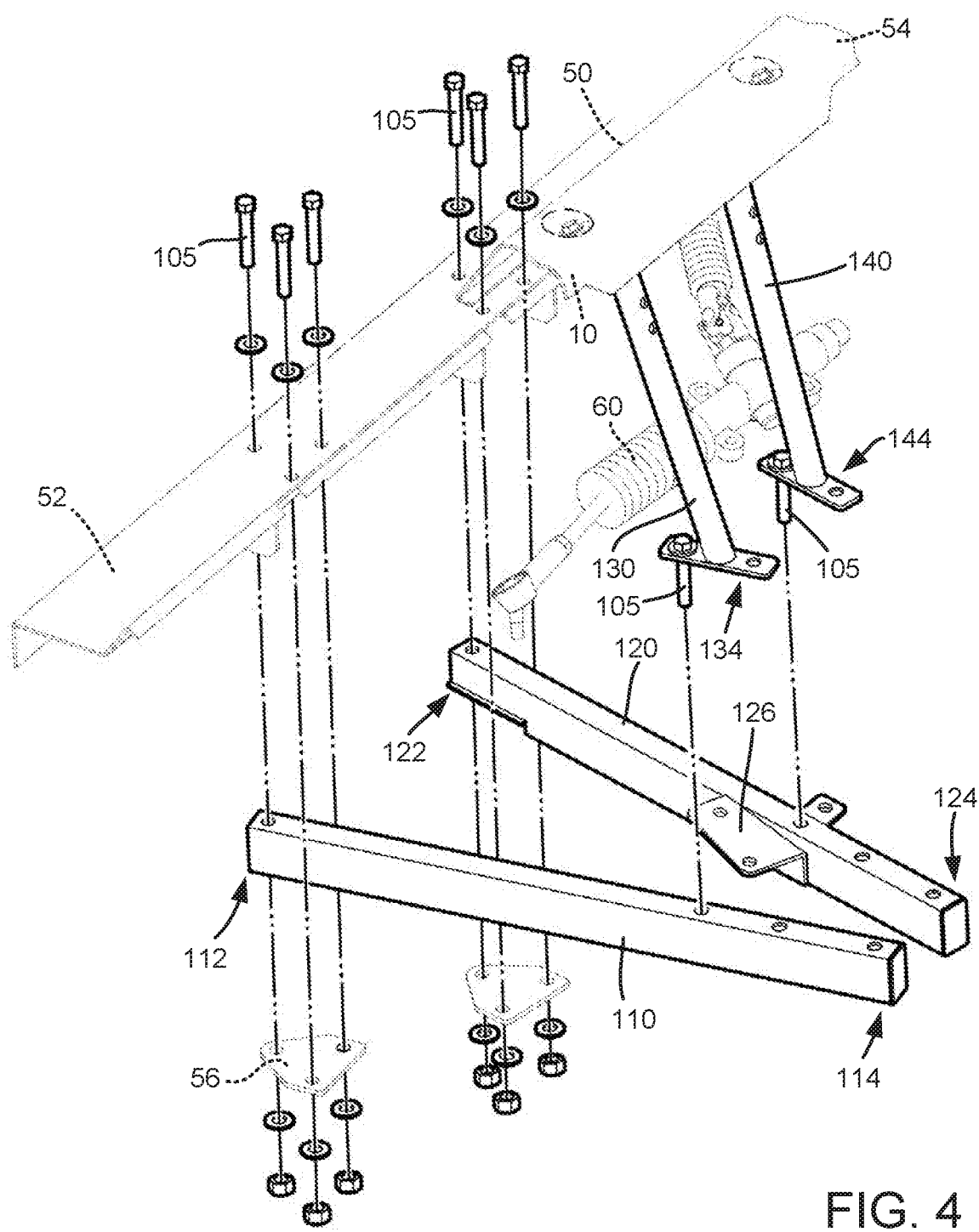

As may be seen in FIGS. 1 and 2, front suspension lift kit 100 includes a first beam 110, a second beam 120, a first strut 130 and a second strut 140. First and second beams 110, 120 and first and second struts 130, 140 are mountable to golf cart 10, e.g., frame 50 of golf cart 10, and may collectively form a support assembly for mounting additional components of front suspension lift kit 100 to golf cart 10. FIGS. 3 and 4 show first and second beams 110, 120 and first and second struts 130, 140 being mounted to frame 50 of golf cart 10. Mounting of first and second struts 130, 140 to frame 50 of golf cart 10 is described in greater detail below in the context of FIG. 3, and mounting of first and second beams 110, 120 to frame 50 of golf cart 10 is described in greater detail below in the context of FIG. 4.

As shown in FIG. 3, first strut 130 may be mounted to frame 50 of golf cart 10, e.g., to a top frame 54 of golf cart 10. Top frame 54 of golf cart 10 may correspond to a location on frame 50 at which stock or factory shocks are mounted, e.g., when golf cart 10 is a E-Z-GO® TXT® golf cart. In certain example embodiments, first strut 130 may extend between a first end portion 132 and a second end portion 134. First strut 130 may be elongated such that a length of first strut 130 between first and second end portions 132, 134 is longer (e.g., significantly) than a width of first strut 130 that is perpendicular to the length of first strut 130. First strut 130 may be mounted to top frame 54 of golf cart 10 at first end portion 132 of first strut 130. Conversely, second end portion 134 of first strut 130 may be spaced from, e.g., below, top frame 54 of golf cart 10.

Second strut 140 may be mounted to frame 50 of golf cart 10, e.g., to top frame 54 of golf cart 10, in a similar manner to first strut 130. For example, second strut 140 may extend between a first end portion 142 and a second end portion 144. Second strut 140 may be elongated such that a length of second strut 140 between first and second end portions 142, 144 is longer (e.g., significantly) than a width of second strut 140 that is perpendicular to the length of second strut 140. Second strut 140 may be mounted to top frame 54 of golf cart 10 at first end portion 142 of second strut 140. Conversely, second end portion 144 of second strut 140 may be spaced from, e.g., below, top frame 54 of golf cart 10. First and second struts 130, 140 may be laterally spaced apart when first and second struts 130, 140 are mounted to frame 50 of golf cart 10.

As shown in FIG. 3, front suspension lift kit 100 may include a plurality of bolts 105 for securing various components of front suspension lift kit 100 to one another and/or to frame 50. In particular, bolts 105 may fasten first end portions 132, 142 of first and second struts 130, 140 to top frame 54 of golf cart 10. The bolts 105 may extend through holes in top frame 54 used to mount the stock or factory shocks to top frame 54. Thus, frame 50 need not be drilled or otherwise modified to mount first and second struts 130, 140 to frame 50.

Turning to FIG. 4, first beam 110 may be mounted to frame 50 of golf cart 10, e.g., to a bottom frame 52 of golf cart 10. Bottom frame 52 of golf cart 10 may correspond to a location on frame 50 at which stock or factory leaf springs are mounted, e.g., when golf cart 10 is a E-Z-GO® TXT® golf cart. In certain example embodiments, first beam 110 extends between a proximal end portion 112 and a distal end portion 114. First beam 110 may be elongated such that a length of first beam 110 between proximal and distal portions 112, 114 is longer (e.g., significantly) than a width of first beam 110 that is perpendicular to the length of first beam 110. First beam 110 may be mounted to bottom frame 52 of golf cart 10 at proximal end portion 112 of first beam 110. Conversely, distal end portion 114 of first beam 110 may be spaced from bottom frame 52 of golf cart 10.

Second beam 120 may also be mounted to frame 50 of golf cart 10, e.g., to bottom frame 52 of golf cart 10, in a similar manner to first beam 110. For example, second beam 120 may extend between a proximal end portion 122 and a distal end portion 124. Second beam 120 may be elongated such that a length of second beam 120 between proximal and distal end portions 122, 124 is longer (e.g., significantly) than a width of second beam 120 that is perpendicular to the length of second beam 120. Second beam 120 may be mounted to bottom frame 52 of golf cart 10 at proximal end portion 122 of second beam 120. Conversely, distal end portion 124 of second beam 120 may be spaced from bottom frame 52 of golf cart 10. First and second beams 110, 120 may be laterally spaced apart when first and second beams 110, 120 are mounted to frame 50 of golf cart 10.

As shown in FIG. 4, bolts 105 may fasten proximal end portions 112, 122 of first and second beams 110, 120 to bottom frame 52 of golf cart 10. The bolts 105 may extend through holes in bottom frame 52 used to mount the stock or factory leaf springs to bottom frame 52 and/or through mounting plates 56 for the stock or factory leaf springs. Thus, frame 50 need not be drilled or otherwise modified to mount first and second beams 110, 120 to frame 50.

First and second struts 130, 140 may also be mounted to first and second beams 110, 120. For example, as shown in FIG. 4, first strut 130 may extend between top frame 54 and first beam 110, and second strut 140 may extend between top frame 54 and second beam 120. In particular, second end portion 134 of first strut 130 may be positioned on and/or mounted to a top portion of first beam 110 at distal end portion 114 of first beam 110. Similarly, second end portion 144 of second strut 140 may be positioned on and/or mounted to a top portion of second beam 120 at distal end portion 124 of second beam 120. In particular, bolts 105 may fasten first and second struts 130, 140 to first and second beams 110, 120 at distal end portions 114, 124 of first and second beams 110, 120.

As shown in FIGS. 3 and 4, first and second beams 110, 120 and first and second struts 130, 140 are mountable to frame 50 of golf cart 10, When mounted on frame 50 of golf cart 10, first and second beams 110, 120 and first and second struts 130, 140 may collectively form a support assembly for additional components of front suspension lift kit 100. Thus, other components of front suspension lift kit 100 may be mounted to one or more of first beam 110, second beam 120, first strut 130 and second strut 140 to assist with adjusting the ride height of golf cart 10 and/or providing an improved suspension for golf cart 10.

In certain example embodiments, first and second beams 110, 120 may be longer than first and second struts 130, 140. As an example, the lengths of first and second struts 130, 140 may be (e.g., about) the same, and the lengths of first and second beams 110, 120 may be (e.g., about) the same. Further, the length of first and second struts 130, 140 may be (e.g., about) half the length of first and second beams 110, 120. In particular, a ratio of the length the length of first and second struts 130, 140 to the length of the first and second beams 110, 120 may be (e.g., about) fifty-four hundredths (0.54).

Turning back to FIGS. 1 and 2, front suspension lift kit 100 includes a support bracket 150 mountable to first and second beams 110, 120. In particular, support bracket 150 is mountable to first and second beams 110, 120 at distal end portions 112, 114 of first and second beams 110, 120. Mounting of support bracket 150 to first and second beams 110, 120 is described in greater detail below in the context of FIG. 5.

Figure 5:
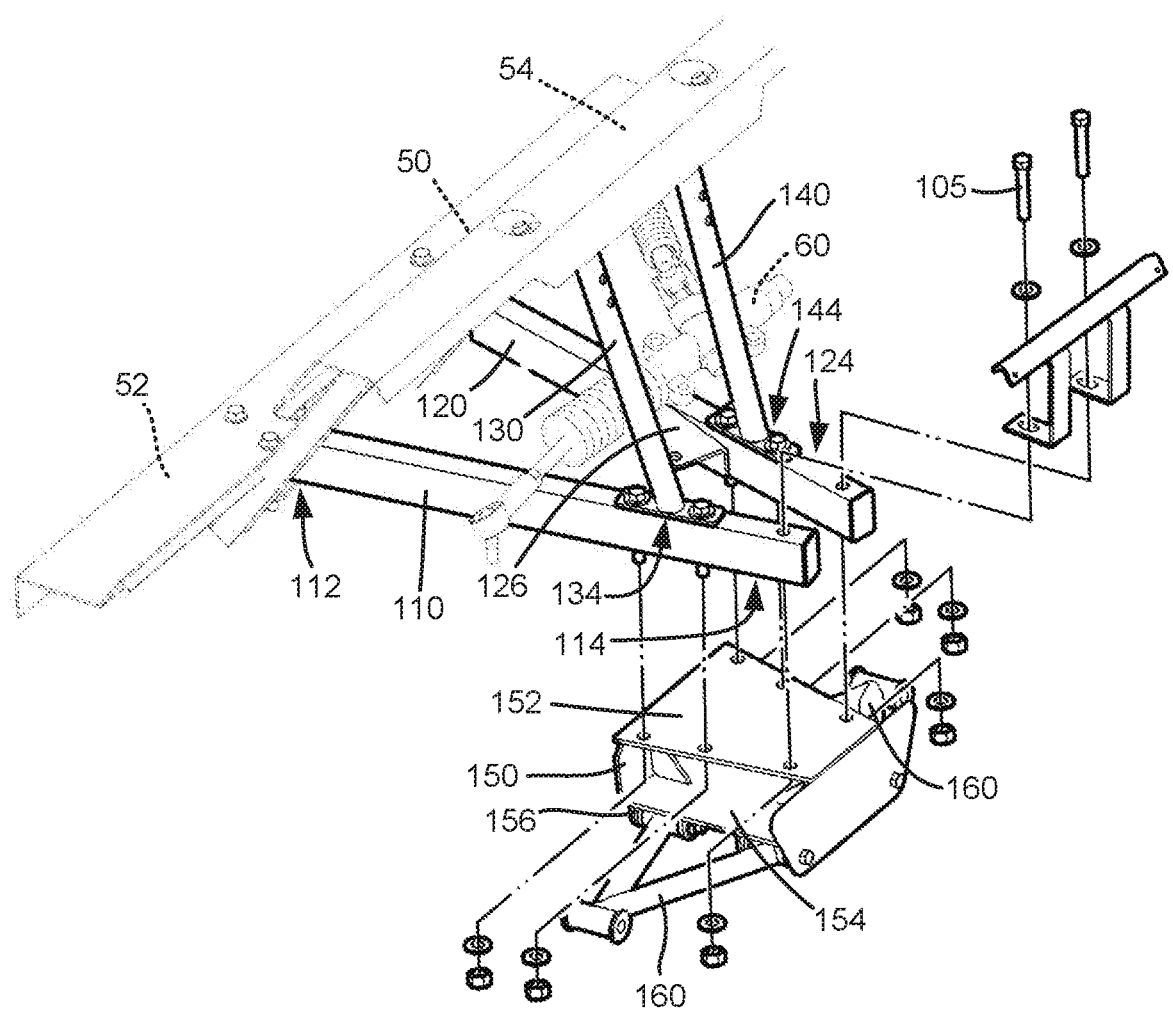

As shown in FIG. 5, support bracket 150 may be mounted to first and second beams 110, 120 at distal end portions 112, 114 of first and second beams 110, 120. For example, support bracket 150 includes a top plate 152 and a bottom plate 154, and top plate 152 of support bracket 150 may be positioned on and mounted to first and second beams 110, 120 at distal end portions 112, 114 of first and second beams 110, 120. In particular, bolts 105 may fasten support bracket 150 to bottom portions of first and second beams 110, 120. As an example, the same bolts 105 that fasten first and second struts 130, 140 to first and second beams 110, 120 may also fasten support bracket 150 to first and second beams 110, 120, as shown in FIG. 5.

Support bracket 150 may provide a mounting location for other components of front suspension lift kit 100. As may be seen in FIG. 6, front suspension lift kit 100 also includes an A-arm or swing arm 160, a spindle carrier or spindle bracket 170, a coil-over shock 180 and a spindle 190. Support bracket 150 may assist with providing a mounting location for such components of front suspension lift kit 100. For the sake of brevity, only one swing arm 160, spindle bracket 170, coil-over shock 180 and spindle 190 are discussed in detail herein. However, it will be understood that front suspension lift kit 100 includes two swing arms, two spindle brackets, two spindles and two coil-over shocks, e.g., one each for the right and left side of golf cart 10. The description provided below for swing arm 160, spindle bracket 170, coil-over shock 180, and spindle 190 is applicable to each of the two swing arms, the two spindle brackets, the two spindles and the two coil-over shocks of front suspension lift kit 100.

Swing arm 160 extends between a first end portion 162 and a second end portion 164. Thus, first and second end portions 162, 164 of swing arm 160 may be spaced or opposite each other on swing arm 160. Swing arm 160 also includes mounting sleeves. Swing arm 160 is mountable to support bracket 150 such that swing arm 160 is rotatable on support bracket 160. In certain example embodiments, swing arm 160 may be rotatably mounted to bottom plate 154 of support bracket 150. Thus, swing arm 160 may be spaced, e.g., vertically below, first and second beams 110, 120 on support bracket 150. Swing arm 160 may be rotatably mounted to bottom plate 154 of bracket 150 with U-brackets 156. For example, U-brackets 156 may be welded, fastened, etc. to bottom plate 154 of support bracket 150. Two U-brackets 156 may be positioned on and/or mounted to each side of bottom plate 154 of support bracket 150. Thus, support bracket 150 may include four U-brackets 156 in certain exemplary embodiments.

As shown in FIG. 1, swing arm 160 may be mounted to support bracket 150 with U-brackets 156. In particular, each of the mounting sleeves at first end portion 162 of swing arm 160 may be positioned within a respective one of U-brackets 156, and axles (e.g., bolts) may extend through U-brackets 156 and the mounting sleeves at first end portion 162 of swing arm 160. Swing arm 160 may pivot on the axle at first end portion 162 of swing arm 160, e.g., such that second end portion 164 of swing arm 160 moves vertically relative to support bracket 150. As may be seen from the above, support bracket 150 is mounted to the support assembly formed by first and second beams 110, 120 and first and second struts 130, 140 to provide a connection point for swing arm 160 to frame 50 of golf cart 10.

Spindle bracket 170 is mountable to swing arm 160. For example, spindle bracket 170 may be rotatably mounted to swing arm 160. Thus, spindle bracket 170 may be rotatable on swing arm 160. In particular, swing arm 160 may be rotatably mounted to support bracket 150 and spindle bracket 170 may be rotatably mounted to swing arm 160 such that a rotational axis X1 of swing arm 160 on support bracket 150 is (e.g., about) parallel to a rotational axis X2 of spindle bracket 170 on swing arm 160. The rotational axes X1 and X2 may also be angled relative to horizontal by about three degrees (3°), e.g., when the golf cart 10 is on level ground.

Figure 6:
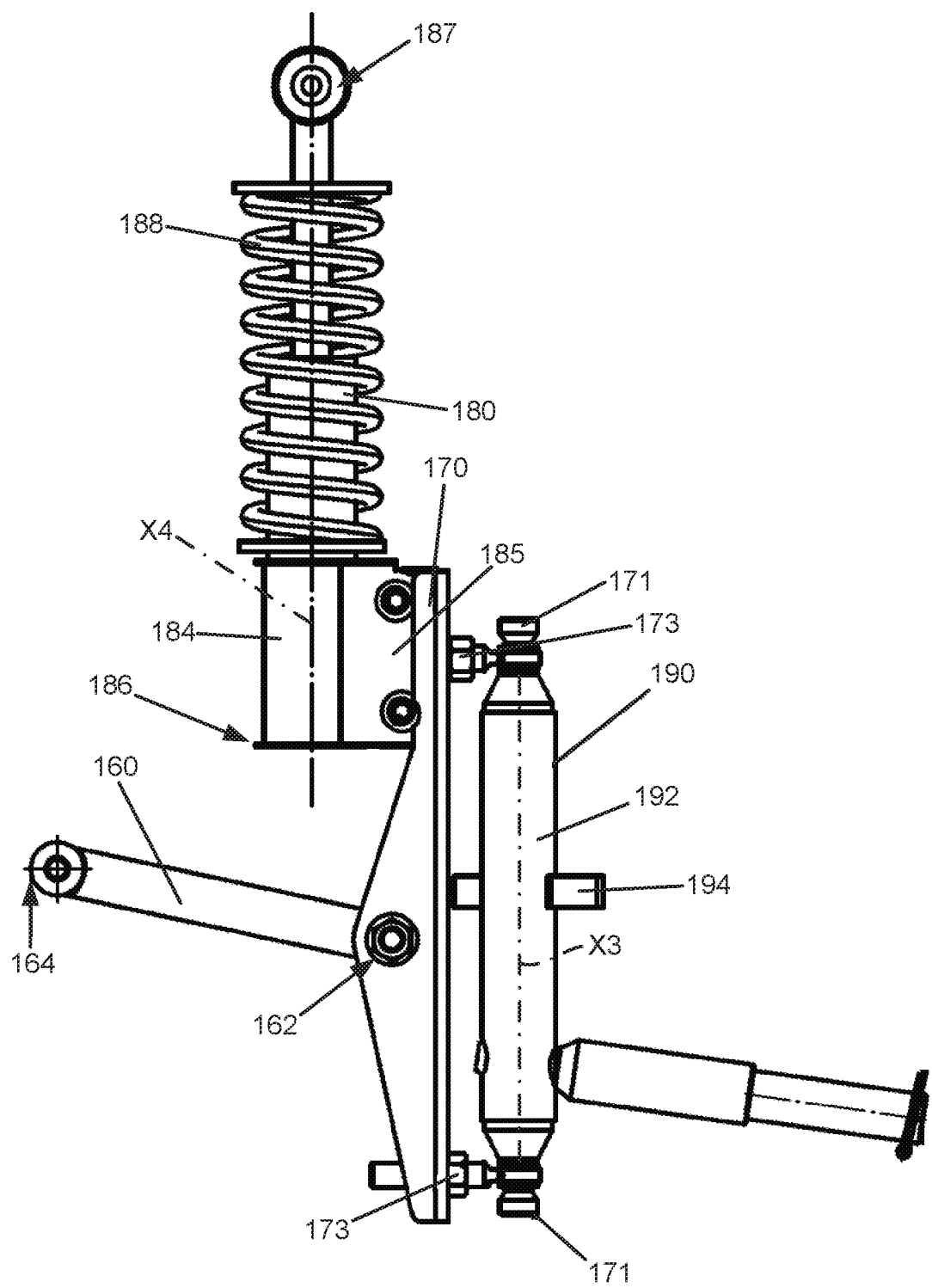
FIG. 6 is a front, elevation view of a spindle assembly of the example front suspension lift kit of FIG. 1.

As may be seen in FIGS. 1, 2 and 6, spindle bracket 170 includes a pair of spindle bearings 171. Spindle bearings 171 are spaced from each other, e.g., vertically, on spindle bracket 170. Thus, spindle 190 is receivable between spindle bearings 171 on spindle bracket 170. In particular, spindle 190 may be mounted to spindle bracket 170 with spindle bearings 171 such that spindle 190 is rotatable on spindle bearings 171 relative to spindle bracket 170. In particular, spindle bracket 170 may be rotatably mounted to swing arm 160 and spindle 190 may be rotatably mounted on spindle bearings 171 such that the rotational axis X2 of spindle bracket 170 on swing arm 160 is (e.g., about) perpendicular to a rotational axis X3 of spindle 190 on spindle bearings 171.

As shown in FIG. 1, spindle bracket 170 may include of be formed with a first wall or plate 174, a second wall or plate 175 and a third wall or plate 176. Second and third plates 175, 176 may be mounted to and extend outwardly from first plate 174. For example, second and third plates 175, 176 may be welded to first plate 174 such that second and third plates 175, 176 extend outwardly from first plate 174. Thus, first, second and third plates 174, 175, 176 may be separate pieces of material, such as steel, that are welded together to form spindle bracket 170. As another example, second and third plates 175, 176 may be bent relative to first plate 174 such that second and third plates 175, 176 extend outwardly from first plate 174. Thus, first, second and third plates 174, 175, 176 may be formed from a common, seamless piece of material, such as steel, that is bent, cast, etc. to form spindle bracket 170.

Second and third plates 175, 176 may be positioned parallel to each other. In addition, swing arm 160 may be mounted to spindle bracket 170 at second and third plates 175, 176. In particular, a mounting sleeve on second end portion 164 of swing arm 160 may be disposed between second and third plates 175, 176, and an axle (e.g., bolt) may extend through the mounting sleeve on second end portion 164 of swing arm 160 and second and third plates 175, 176. In such a manner, swing arm 160 may be rotatably mounted to spindle bracket 170. In particular, spindle bracket 170 may translate vertically with swing arm 160, e.g., when second end portion 164 of spring arm 160 translates vertically during pivoting of swing arm 160 on support bracket 150, and spindle bracket 170 may also pivot relative to swing arm 160, e.g., to allow a wheel (not shown) on spindle 190 to translate and/or pivot.

Turning back to FIG. 6, spindle bearings 171 are configured to support spindle 190. For example, spindle 190 may be mounted to spindle bearings 171 such that spindle 190 extends between spindle bearings 171 on spindle bracket 170. Spindle bearings 171 may be positioned on first plate 174. In particular, spindle bearings 171 may be mounted to first plate 174 with nuts 173. Nuts 173 may be treaded onto spindle bearings 171 and compressed against spindle bracket 170, e.g., where spindle bearings 171 extend through first plate 174, to mount spindle bearings 171 to first plate 174. By adjusting the position of nuts 173 on the treaded portion of spindle bearings 171, a camber of a wheel on spindle 190 may be adjusted. With spindle 190 mounted to spindle bracket 170 with spindle bearings 171, spindle 190 may rotate relative to spindle bracket 170 on spindle bearings 171.

Spindle 190 may include a cylinder 192 and a steering arm 194. Steering arm 194 may extend outwardly from cylinder 192 of spindle 190. Steering arm 194 of spindle 190 is configured for connecting to a tie rod 198, as shown in FIG. 2. Thus, e.g., steering arm 194 may be bolted to tie rod 198. Both spindles 190 may be coupled together with tie rod 198, e.g., such that spindles 190 rotate together.

Steering arm 198 may also include a second steering arm 195, as shown in FIG. 2. Second steering arm 195 provides a connection point for a rack-and-pinion 60 of golf cart 10. Thus, rack-and-pinion 60 may be coupled to second steering arm 195, e.g., such that rack-and-pinion 60 rotates spindle 190 when a driver of golf cart 10 turns a steering wheel (not shown) of golf cart 10. Thus, e.g., spindle 190 and second steering arm 195 may accommodate the increased ride height provided by front suspension lift kit 100 relative to the stock ride height of golf cart 10 and allow the existing steering system of golf cart 10 to connect to front suspension lift kit 100. With reference to FIGS. 1 and 5, second beam 120 (or first beam 110) may include a mounting plate 126. Rack-and-pinion 60 of golf cart 10 may be positioned on and mounted to second beam 120 via mounting plate 126.

Coil-over shock 180 includes a cylinder 184, a pair of flanges 185 and a coil 188. Coil-over shock 180 also extends between a first end portion 186 and a second end portion 187. First and second end portions 186, 187 may be spaced apart and positioned opposite each other on coil-over shock 180. Cylinder 184 is positioned at first end portion 186 of coil-over shock 180. Conversely, coil 188 may be positioned at second end portion 187 of coil-over shock 180. Thus, cylinder 184 and coil 188 may be positioned at opposite ends of coil-over shock 180. Cylinder 184 may include at least a portion of a damper, and coil 188 may be a helical spring. Thus, the components of coil-over shock 180 may collectively form a spring-damper system that regulates, e.g., vertical motion of spindle 190 on swing arm 160.

Flanges 185 of coil-over shock 180 extend outwardly from cylinder 184, e.g., at first end portion 186 of coil-over shock 180. Flanges 185 of coil-over shock 180 are mountable to spindle bracket 170. Thus, flanges 185 provide a connection point between coil-over shock 180 and spindle bracket 170. When flanges 185 are mounted to spindle bracket 170, flanges 185 of coil-over shock 180 may be positioned proximate the top one of spindle bearings 171 on spindle bracket 170. Flanges 185 may be bolted or otherwise suitable fastened to first plate 174 of spindle bracket 170. In such a manner, coil-over shock 180, e.g., first end portion 186 of coil-over shock 180, may be mounted to spindle bracket 170, and the connection between spindle bracket 170 and coil-over shock 180 may facilitate vibration transfer from spindle 190 to coil-over shock 180.

Coil-over shock 180 may also be mounted to frame 50 of golf cart 10. For example, second end portion 187 of coil-over shock 180 may be rotatably mounted to a shock bracket 189. In particular, coil-over shock 180 may be connected to shock bracket 189 at second end portion 187 of coil-over shock 180 with a bolt. Shock bracket 189 may be mounted to first and second struts 130, 140, e.g., at or adjacent, first end portions 132, 142 of first and second struts 130, 140. Shock bracket 189 may be also be positioned above first and second beams 110, 120 on first and second struts 130, 140.

Shock bracket 189 and/or second end portion 187 of coil-over shock 180 may be positioned above or over cylinder 184 and/or flanges 185 of coil-over shock 180. Thus, e.g., coil-over shock 180 may be generally (e.g., within three degrees) vertically oriented with second end portion 187 of coil-over shock 180 positioned at or adjacent the top of coil-over shock 180 and cylinder 184 and/or flanges 185 of coil-over shock 180 positioned at or adjacent the bottom of coil-over shock 180. A stroke axis X4 of coil-over shock 180 may be (e.g., about) parallel to the rotational axis X3 of spindle 190 on spindle bearings 171. The rotational axis X3 and the stroke axis X4 may also be angled relative to vertical by about three degrees (3°), e.g., when the golf cart 10 is on level ground. Such angling may facilitate vibration transfer from spindle 190 to coil-over shock 180.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A front suspension lift kit for a golf cart, comprising:
   a first beam mountable to a frame of the golf cart;
   a second beam mountable to the frame of the golf cart;
   a first strut mountable to the frame of the golf cart and a distal end portion of the first beam such that the first strut extends between the frame of the golf cart and the first beam;
   a second strut mountable to the frame of the golf cart and a distal portion of the second beam such that the second strut extends between the frame of the golf cart and the second beam;
   a bracket mountable to the first and second beams at the distal end portions of the first and second beams;
   a swing arm mountable to the bracket such that the swing arm is rotatable on the bracket;
   a spindle bracket mountable to the swing arm such that the spindle bracket is rotatable on the swing arm; and
   a coil-over shock mountable to the spindle bracket.

2. The front suspension lift kit of claim 1, wherein the coil-over shock comprises a cylinder and a flange, the flange of the coil-over shock extending outwardly from the cylinder of the coil-over shock, the flange of the coil-over shock mountable to the spindle bracket such that the flange of the coil-over shock is positioned at an upper one of a pair of spindle bearings on the spindle bracket.

3. The front suspension lift kit of claim 2, wherein the spindle bracket further comprises a first plate, a second plate and a third plate, the second and third plates extending outwardly from the first plate, the pair of spindle bearings positioned on the first plate, an end of the swing arm receivable between the second and third plates of the spindle bracket.

4. The front suspension lift kit of claim 1, further comprising a spindle mountable on a pair of spindle bearings of the spindle bracket such that the spindle is rotatable on the pair of spindle bearings.

5. The front suspension lift kit of claim 4, wherein the spindle comprises a cylinder and a steering arm, the steering arm extending outwardly from the cylinder of the spindle, the steering arm of the spindle configured for connecting to a tie rod.

6. The front suspension lift kit of claim 1, further comprising a shock bracket mountable to the first and second struts above the first and second beams, an end of the coil-over shock rotatably mountable to the shock bracket.

7. The front suspension lift kit of claim 6, wherein the coil-over shock comprises a cylinder and a flange, the flange of the coil-over shock extending outwardly from the cylinder of the coil-over shock, the flange of the coil-over shock mountable to the spindle bracket, the end of the coil-over shock and the flange of the coil-over shock positioned opposite each other on the coil-over shock.

8. The front suspension lift kit of claim 1, wherein the first strut extends between a first end portion and a second end portion, the first end portion of the first strut mountable to the frame above the second end portion of the first strut, the second end portion of the first strut mountable to the first beam.

9. The front suspension lift kit of claim 1, wherein the first beam comprises a mounting plate, a rack and pinion of the golf cart mountable to the mounting plate.

10. The front suspension lift kit of claim 1, wherein the first strut is mountable to the first beam at a top portion of the first beam, the second strut is mountable to the second beam at a top portion of the second beam, and the bracket is mountable to the first and second beams at a bottom portion of the first beam and a bottom portion of the second beam.

11. The front suspension lift kit of claim 1, wherein a proximal end portion of the first beam is mountable to the frame of the golf cart, and a proximal end portion of the second beam is mountable to the frame of the golf cart.

12. The front suspension lift kit of claim 1, further comprising a plurality of bolts for mounting the first beam, the second beam, the first strut, and the second strut to the frame of the golf cart.

13. The front suspension lift kit of claim 1, wherein the first and second beams are longer than the first and second struts.

14. A front suspension lift kit for a golf cart, comprising:
a first beam having a proximal end portion that is mountable to a frame of the golf cart;
a second beam having a proximal end portion that is mountable to the frame of the golf cart;
a first strut mountable to the frame of the golf cart and a distal end portion of the first beam such that the first strut extends between the frame of the golf cart and the first beam;
a second strut mountable to the frame of the golf cart and a distal portion of the second beam such that the second strut extends between the frame of the golf cart and the second beam;
a support bracket mountable to the first and second beams at the distal end portions of the first and second beams;
a swing arm mountable to the support bracket such that the swing arm is rotatable on the support bracket;
a spindle bracket mountable to the swing arm such that the spindle bracket is rotatable on the swing arm, the spindle bracket comprising a pair of spindle bearings;
a spindle mountable to the spindle bracket such that the spindle is rotatable on the pair of spindle bearings;
a shock bracket mountable to the first and second struts above the first and second beams; and
a coil-over shock mountable to the spindle bracket and the shock bracket, the coil-over shock comprising a cylinder and a flange, the flange of the coil-over shock extending outwardly from the cylinder of the coil-over shock, the flange of the coil-over shock mountable to the spindle bracket, an end of the coil-over shock rotatably mountable to the shock bracket, the end of the coil-over shock and the flange of the coil-over shock positioned opposite each other on the coil-over shock.

15. The front suspension lift kit of claim 14, wherein the flange of the coil-over shock is mountable to the spindle bracket such that the flange of the coil-over shock is positioned at an upper one of the pair of spindle bearings on the spindle bracket.

16. The front suspension lift kit of claim 15, wherein the spindle bracket further comprises a first plate, a second plate and a third plate, the second and third plates extending outwardly from the first plate, the pair of spindle bearings positioned on the first plate, an end of the swing arm receivable between the second and third plates of the spindle bracket.

17. The front suspension lift kit of claim 14, wherein the first beam comprises a mounting plate, a rack and pinion of the golf cart mountable to the mounting plate.

18. The front suspension lift kit of claim 14, wherein the first strut is mountable to the first beam at a top portion of the first beam, the second strut is mountable to the second beam at a top portion of the second beam, and the support bracket is mountable to the first and second beams at a bottom portion of the first beam and a bottom portion of the second beam.

19. The front suspension lift kit of claim 14, further comprising a plurality of bolts for mounting the first beam, the second beam, the first strut, and the second strut to the frame of the golf cart.

20. The front suspension lift kit of claim 14, wherein the first and second beams are longer than the first and second struts.

* * * * *